United States Patent
Chase et al.

[19]

[11] Patent Number: 6,034,593
[45] Date of Patent: Mar. 7, 2000

[54] COMMUNICATION SYSTEM AND METHOD FOR KEYLESS-ENTRY ALARMS

[75] Inventors: Thomas J. Chase, Segun, Tex.; Stephane D. Chapeau, Duluth, Ga.

[73] Assignee: Motorola, Inc., Schaumburg, Ill.

[21] Appl. No.: 09/127,130

[22] Filed: Jul. 31, 1998

[51] Int. Cl.$^7$ ................................................. B60R 25/10
[52] U.S. Cl. ............. 340/426; 340/825.44; 340/825.72; 340/825.69; 340/539; 340/429; 340/522; 307/10.2; 307/10.5
[58] Field of Search ................. 340/825.44, 825.72, 340/825.69, 426, 539, 429, 522; 307/10.2, 10.5

[56] References Cited

U.S. PATENT DOCUMENTS

| | | | |
|---|---|---|---|
| 5,600,299 | 2/1997 | Tompkins | 340/429 |
| 5,677,664 | 10/1997 | Sawinski | 340/426 |
| 5,774,050 | 6/1998 | Kagi | 340/539 |
| 5,808,547 | 9/1998 | Carney | 340/541 |
| 5,812,051 | 9/1998 | Talbow et al. | 340/426 |
| 5,818,329 | 10/1998 | Allen | 340/426 |
| 5,850,173 | 12/1998 | DiCroce et al. | 340/426 |
| 5,850,188 | 12/1998 | Doyle et al. | 340/825.69 |
| 5,864,297 | 1/1999 | Sollestre et al. | 340/825.31 |

*Primary Examiner*—Daniel J. Wu
*Assistant Examiner*—Tai T. Nguyen
*Attorney, Agent, or Firm*—Nicholas C. Hopman; Gary J. Cunningham

[57] ABSTRACT

A communication system and method for keyless-entry alarms includes a vehicle-mounted alarm transducer (215) controlled by a vehicle-mounted control system (250) that includes a receiver (207). The system also includes a hand-held R.K.E. transmitter device (200) for transmitting a radio-frequency message. The vehicle-mounted alarm transducer (215) is deactivated when receiving the transmitted radio-frequency message. If the vehicle-mounted alarm transducer (215) was active when it was deactivated, and a deactivate-alarm command code is not received in the radio-frequency message, then the vehicle-mounted alarm transducer (215) is reactivated after the transmitted radio-frequency message is completely received and decoded.

4 Claims, 2 Drawing Sheets

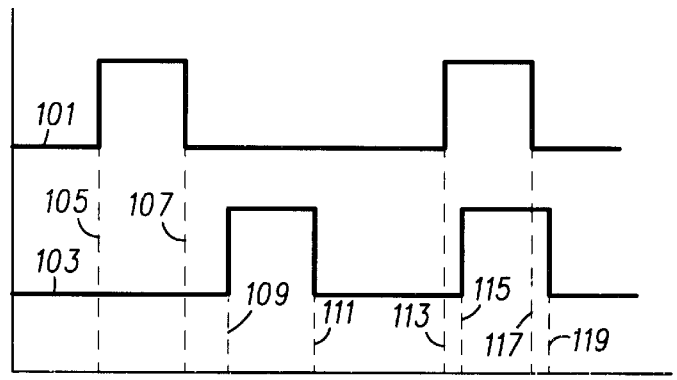
FIG. 1 —PRIOR ART—
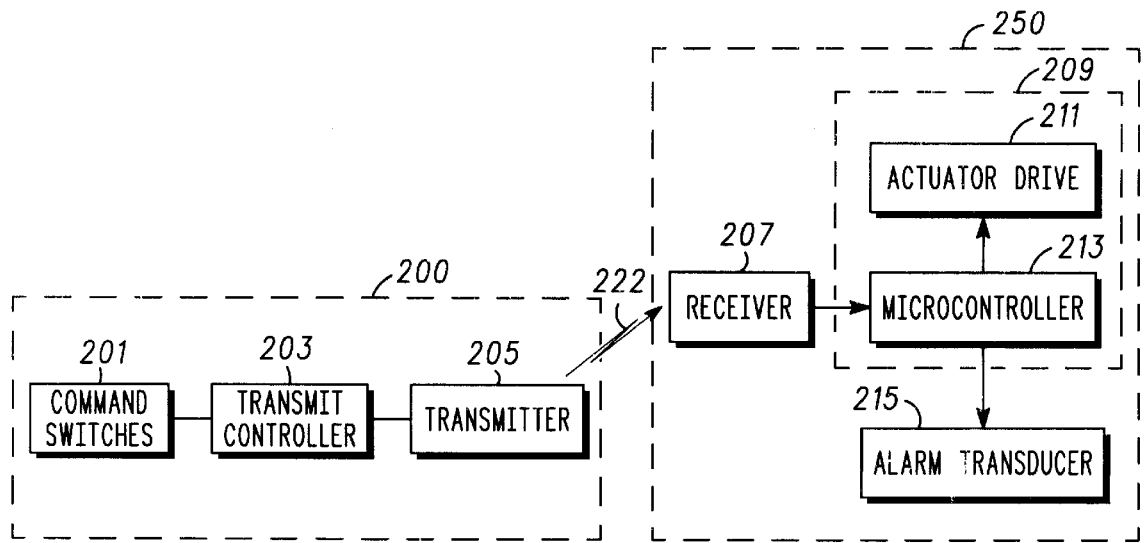
FIG. 2

COMMUNICATION SYSTEM AND METHOD FOR KEYLESS-ENTRY ALARMS

FIELD OF THE INVENTION

This invention is related to the field of alarm systems and more particularly to an approach for communicating between an alarm system and a remote unit.

BACKGROUND OF THE INVENTION

Contemporary vehicle's often employ Remote Keyless Entry (R.K.E.) systems that include control functions such as those to unlock doors of the vehicle, start the engine in the vehicle, or to open a garage door. Typically radio signals are transmitted from an R.K.E. transmitter which is typically a portable device, to an R.K.E. receiver which is typically mounted in a vehicle or in a garage.

Once appropriate signals have been received, transducers associated with the R.K.E. receiver will activate and control various physical behaviors. For example, if a message is transmitted from the R.K.E. transmitter commanding to lock a door of the vehicle, the receiver decodes it and commands a lock transducer to lock the vehicle's door.

Often vehicles have built-in alarm systems that can be activated, for instance, when someone attempts to break into the vehicle. When the vehicle's owner returns to the vehicle, the owner will attempt to shut off the alarm using the R.K.E. transmitter. The problem with this approach is that the deactivation message transmitted from the R.K.E. transmitter can overlap with activation of the alarm—which is pulsed on and off periodically. While the alarm is sounding electrical disturbance it causes can cause the R.K.E. receiver to improperly decode the transmitted message. An example of such an operation is shown in FIG. 1.

A first waveform 101 indicates when the alarm is active. Commencing at reference number 105 the alarm is activated. At reference number 107 the alarm is deactivated. The period between reference numbers 105 and 107 may be on the order of one second. The alarm remains silent until reference number 113 where it is again reactivated until reference number 117.

A second waveform 103 indicates when messages are transmitted from the R.K.E. transmitter. A first message commences at reference number 109 and concludes at reference number 111. Note there is no overlap between the activated alarm and the first message. When this happens the first message is easily decoded without interference from the alarm. Next, a second message is transmitted from the R.K.E. transmitter between reference numbers 115 and 119. As mentioned earlier, at reference number 113 the alarm is activated. Because the activation of the alarm overlaps the transmission of the second message from the R.K.E. transmitter, the second message may not be correctly decoded. If the second message requested that the alarm be deactivated, then the alarm would not be shut off.

Summarizing, while the R.K.E. receiver can correctly detect the presence of the transmitted message the alarm causes the transmitted message data to be corrupted so that the alarm cannot be deactivated.

Since transmission of the message and activation of the alarm are time independent, adjustment of their respective periodic behavior will not be an acceptable solution.

What is needed is an improved approach that will enable proper decoding of a received message without interference by the alarm.

BRIEF DESCRIPTION OF THE DRAWINGS

FIG. 1 is a timing diagram of an alarm and communication sequence in a keyless entry system with an alarm function;

FIG. 2 As a schematic block diagram of a R.K.E. system in accordance with a preferred embodiment of the invention.

DETAILED DESCRIPTION OF THE PREFERRED EMBODIMENT

Figure 3:
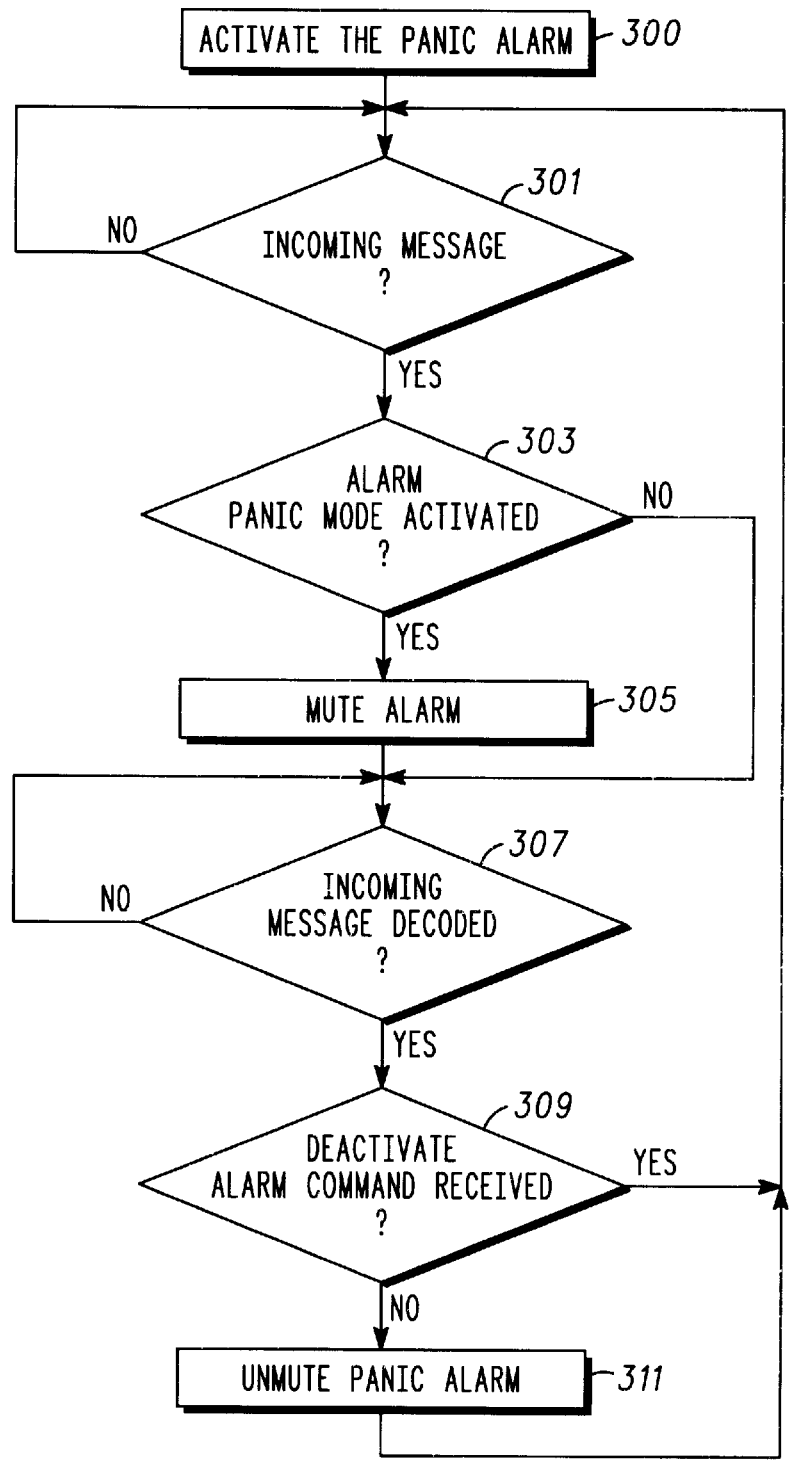
FIG. 3 is a flow chart showing a preferred method of the receiver portion of a Remote Keyless Entry (R.K.E.) system in accordance with the preferred embodiment of the invention.

A communication system and method for keyless-entry alarms includes a vehicle-mounted alarm transducer controlled by a vehiclemounted control system that includes a receiver. The system also includes a hand-held R.K.E. transmitter device for transmitting a radio-frequency message. The vehicle-mounted alarm transducer is deactivated when receiving the transmitted radio-frequency message. If the vehicle-mounted alarm transducer was active when it was deactivated, and a deactivate-alarm command code is not received in the radio-frequency message, then the vehicle-mounted alarm transducer is reactivated after the transmitted radio-frequency message is completely received and decoded.

FIG. 2 is a schematic block diagram of the R.K.E. system. The hand-held R.K.E. transmitter device 200, also referred to as a transmitter, includes a transmit controller 203, which interprets the command switches 201, and transmits an assembled data packet 222 using its transmitter 205. The transmit controller 203 can be constructed using digital circuitry, a microcontroller, or any other mechanism which essentially transmits an encoded message. In the preferred embodiment a Motorola MC68HC05 microcontroller is used.

An R.K.E. control system 250, also referred to as a receiver, includes a receiver controller 209. Note that the R.K.E. control system 250 is mounted in a vehicle. The receiver controller 209 includes an transducer drive circuit 211, and another microcontroller 213. According to the preferred method, the receiver controller 209 receives the transmitted data packet 222 via its receiver 207. The microcontroller 213, again preferably a Motorola MC68HC05 microcontroller with on-board program memory to store the portion of the preferred method described later, interprets the data packet 222 and commands the actuator drive 211 to drive external transducers, or to drive an alarm transducer 215. These external transducers include door lock solenoids and engine starting devices. Now that the hardware platform has been presented, the preferred steps will be detailed with reference to FIG. 3.

FIG. 3 is a flow chart showing a preferred method of the receiver portion of a Remote Keyless Entry (R.K.E.) system in accordance with the preferred embodiment of the invention. The method shown in this flow chart is encoded into the microcontroller 213.

In step 300 a panic alarm is activated. Essentially, the microcontroller 213 activates the alarm transducer 215.

Next, in step 301 the microcontroller 213 periodically checks to see if a transmitted a radio-frequency message is incoming. If a message is being received, then step 303 is executed.

Then, in step 303 the method checks to see if an alarm panic mode is presently activated. If an alarm panic mode is presently activated, then in step 305 the alarm is temporarily muted. If an alarm panic mode is not presently activated, then the method branches to step 307.

In step 307 the method waits until the incoming message is decoded. If the data packet associated with the incoming message includes a deactivate-alarm command in step 309, then the method returns to step 301.

If the data packet associated with the incoming message does not include a deactivate-alarm command, then the method unmutes the panic alarm in step 311.

An improved approach has been detailed that will enable proper decoding of a received message without interference by the alarm. This allows deactivation of the alarm from a remote transmitter.

What is claimed is:

1. A communication method for keyless entry alarms comprising the steps of:

activating a vehicle-mounted alarm transducer;

transmitting a radio-frequency message; and delaying activation of the vehicle-mounted alarm transducer while receiving the transmitted radio-frequency message to facilitate reception of the radio-frequency message.

2. A method in accordance with claim 1 wherein the transmitted radio-frequency message comprises a command code, the method further comprising a step of:

decoding the transmitted radio-frequency message and reactivating the alarm transducer when a deactivate-alarm command code is not decoded.

3. A keyless entry alarm system for a vehicle comprising:

a remote transmitter for transmitting a message;

a vehicle-mounted control system with a receiver operatively coupled to an alarm transducer; wherein the receiver delays activation of the alarm transducer while receiving the message transmitted by the remote transmitter to facilitate reception of the message.

4. A system in accordance with claim 3 wherein the remote transmitter comprises a radio-frequency transmitter and the receiver comprises a radio-frequency receiver.

* * * * *